United States Patent
Kuhn et al.

(10) Patent No.: US 10,294,352 B2
(45) Date of Patent: May 21, 2019

(54) CURABLE, HIGHLY TRANSPARENT SILICONE COMPOSITION WITH IMPROVED MECHANICS, FOR OPTICAL COMPONENTS

(71) Applicant: Wacker Chemie AG, Munich (DE)

(72) Inventors: Arvid Kuhn, Burghausen (DE); Inge Schreiber, Julbach (DE)

(73) Assignee: WACKER CHEMIE AG, Munich (DE)

( * ) Notice: Subject to any disclaimer, the term of this patent is extended or adjusted under 35 U.S.C. 154(b) by 4 days.

(21) Appl. No.: 15/526,492

(22) PCT Filed: Oct. 29, 2015

(86) PCT No.: PCT/EP2015/075111
§ 371 (c)(1),
(2) Date: May 12, 2017

(87) PCT Pub. No.: WO2016/078890
PCT Pub. Date: May 26, 2015

(65) Prior Publication Data
US 2017/0321039 A1   Nov. 9, 2017

(30) Foreign Application Priority Data
Nov. 21, 2014   (DE) .......... 10 2014 223 785

(51) Int. Cl.
| | |
|---|---|
| *C08K 9/06* | (2006.01) |
| *C08K 3/36* | (2006.01) |
| *C09D 183/04* | (2006.01) |
| *C08L 83/04* | (2006.01) |
| *C08K 5/56* | (2006.01) |
| *C08L 83/00* | (2006.01) |
| *C08G 77/12* | (2006.01) |
| *C08G 77/20* | (2006.01) |

(52) U.S. Cl.
CPC .......... *C08K 9/06* (2013.01); *C08K 3/36* (2013.01); *C08K 5/56* (2013.01); *C08L 83/00* (2013.01); *C08L 83/04* (2013.01); *C09D 183/04* (2013.01); *C08G 77/12* (2013.01); *C08G 77/20* (2013.01); *C08K 2201/006* (2013.01)

(58) Field of Classification Search
CPC ...... C08K 9/06; C08K 2201/006; C08L 83/04
See application file for complete search history.

(56) References Cited

U.S. PATENT DOCUMENTS

| | | |
|---|---|---|
| 3,996,189 A | 12/1976 | Travnicek |
| 5,618,872 A | 4/1997 | Pohl et al. |
| 5,661,210 A * | 8/1997 | Burns ............ C08K 9/06 524/493 |
| 7,282,270 B2 | 10/2007 | Morita et al. |
| 2004/0198924 A1* | 10/2004 | Young ............ G02B 1/04 525/474 |
| 2005/0070626 A1 | 3/2005 | Lowery |
| 2012/0235190 A1 | 9/2012 | Keller et al. |
| 2014/0088251 A1 | 3/2014 | Ko et al. |

FOREIGN PATENT DOCUMENTS

| | | |
|---|---|---|
| EP | 0 644 914 | 3/1995 |
| EP | 1 424 363 A1 | 6/2004 |
| EP | 2 336 230 A1 | 6/2011 |
| EP | 2 735 590 A2 | 5/2014 |
| KR | 20090103785 A | 10/2009 |
| KR | 20130058646 A | 6/2013 |
| WO | 93/25611 A1 | 12/1993 |
| WO | 2012128966 A2 | 9/2012 |
| WO | WO2013077702 A1 * | 5/2013 |

OTHER PUBLICATIONS

ISOS XVII Berlin 2014, The 17th International Symposium on Silicon Chemistry, Berlin, Aug. 3-8, 2014; Program—Abstracts [ISBN 978-3-936028-85-0], PO-174, Paper "Aeroxide Fumed Metal Oxides—Fillers for Optical Applications" on May 21, 2014 at the "2014 International Silicone Conference" in Akron, Ohio, USA, presented by Simon Nordschild, Evonik Industries AG.
G.W. Sears et al., Analytical Chemistry, vol. 28, No. 12, 1956, 28, 1981 ff.

* cited by examiner

*Primary Examiner* — Robert S Jones
(74) *Attorney, Agent, or Firm* — Brooks Kushman P.C.

(57) ABSTRACT

Cast silicone compositions with high transparency suitable for use as optical components contain a base polymer with a refractive index ≥1.42, and a reinforcing particulate silica which is surface modified to have a refractive index within 0.03 of the refractive index of the base polymer, by reaction with an aryl-silane or aryl-siloxane.

15 Claims, No Drawings

CURABLE, HIGHLY TRANSPARENT SILICONE COMPOSITION WITH IMPROVED MECHANICS, FOR OPTICAL COMPONENTS

CROSS REFERENCE TO RELATED APPLICATIONS

This application is the U.S. National Phase of PCT Appln. No. PCT/EP2015/075111 filed Oct. 29, 2015, which claims priority to German Application No. 10 2014 223 785.8 filed Nov. 21, 2014, the disclosures of which are incorporated in their entirety by reference herein.

BACKGROUND OF THE INVENTION

1. Field of the Invention

The invention relates to a high-transparency silicone composition having improved mechanical properties and to use thereof in optical components.

2. Description of the Related Art

Casting compounds for optical semiconductor components such as LEDs (light emitting diodes) or materials for compression molding or injection molding, for the production, for example, of lenses for secondary optical systems, are required to protect the components from ambient mechanical and chemical influences, to be thermally robust, to exhibit high transparency, and to ensure a high level of outcoupling of light. Common materials for the casting of LEDs in this context are, for example, epoxy compounds or silicone compounds.

There has been a preference for silicone over epoxy casting compounds with respect to thermal stability.

For use as primary or secondary optical systems in optical elements, the silicone systems are required to exhibit high optical transparency in the visible range and to some extent also in the UV range (UV-Vis) of the electromagnetic spectrum. With crosslinked polydiorganosiloxanes, high transmission levels are achieved at wavelengths down to below 300 nm. A drawback of these systems is that the hardnesses are limited to the lower Shore A range and the mechanical robustness is very low. When silicone resins are used, significantly higher hardnesses can be achieved (upper Shore A through into the shore D range), with similarly good transmission levels.

EP 1424363 B1 describes compositions comprising alkenyl-functional silicone resins in combination with SiH components, the vulcanizates thereof having hardnesses in the Shore D range.

Silicone systems with alkyl substituents have refractive indices $n_D^{25}$ of around 1.41. By using aryl substituents such as phenyl it is possible to extend the refractive index to $n_D^{25}>1.50$. The use of casting compounds with such extended refractive index in optical semiconductor components improves light outcoupling and so leads to greater efficiency on the part of the components. U.S. Pat. No. 7,282,270 B2 describes corresponding compositions comprising alkenyl- and aryl-functional silicone resins in combination with Si—H components, featuring high refractive indices. Through the use of silicone resin formulations it is certainly possible to achieve vulcanizates having hardnesses in the Shore D range. Nevertheless, other mechanical properties, such as the elongation at break, for example, remain very low. This is a disadvantage in casting compounds or components in secondary optical systems, since the high thermal stresses cause increased cracking in the cured material if the elongation at break is low.

The mechanical properties of silicones are generally improved by adding reinforcing fillers having specific surface areas of between 50 and 400 m²/g. Examples of active reinforcing fillers include finely divided fumed or precipitated silicas or else other pyrogenic metal oxides. Vulcanizates made from such silicone rubbers reinforced with fumed silica, for example, are nevertheless no longer of high transparency, owing to optical scattering effects, even if the particles of filler are smaller than the wavelength of visible light.

To obtain optically transparent mixtures, it is necessary for the refractive indices of filler and polymer to be adapted to one another.

EP 0644914 B1 describes a "Process for the production of optically homogeneous, highly transparent or light-scattering polymeric shaped articles or of embedding compositions" composed of organic matrix materials and inorganic fillers such as metal oxides, the refractive index of the filler particles being adapted to the refractive index of the organic matrix. Thus, for example, $SiO_2/TiO_2$ mixed oxide particles having a refractive index of 1.52 are produced, corresponding to the refractive index of an epoxy resin system used for embedding optical components, thus allowing high-transparency mixtures.

In contrast to this, US 2012/0235190 A1, "Encapsulant with index matched thixotropic agent", for example, describes how fumed silica ($SiO_2$) is often used as a thixotropic additive. As a result of the differences in refractive index n between silicone polymer used (presently n=1.51) and fumed silica (n=1.46), however, the light of the LED can be scattered, possibly leading to hazing of the casting compound and to a reduction in luminous efficiency. Instead of fumed silica, therefore, composite additives such as aluminosilicates, for example, are used preferentially as thixotropic additives, having refractive indices which differ only little from those of the polymers used. The specification gives no pointers to modifying the mechanical properties through use of such thixotropic additives.

In the poster presentation PO-173 at the 17th International Symposium for Silicone Chemistry [ISOS XVII BERLIN 2014, ISBN 978-3-936028-85-0], the author discloses the refractive indices of fillers based on pyrogenic metal mixed oxides (trade name AEROXIDE®, from Evonik) such as $SiO_2/Al_2O_3$, for example, as a function of the mixing ratio. Given a suitable mixing ratio, the refractive index of the metal mixed oxide can correspond to the refractive index of phenyl-containing polyorganosiloxanes that are often used in optical applications. These mixtures adapted in terms of the refractive index of filler and polymer exhibit greater transparency than mixtures in which filler and polymer have different refractive indices. The author, moreover, indicates that adaptation of the refractive index of fumed silica to the refractive index of the new methyl-phenyl-polysiloxane matrix is not possible. Consequently, such systems have poor transparency and thus a lower effectiveness as a result of the increased light scattering. In his paper "AEROXIDE® Fumed Metal Oxides—Fillers for Optical Applications" on May 21, 2014 at the "2014 International Silicone Conference" in Akron, Ohio, USA, the presenter, Simon Nordschild, Evonik Industries AG, disclosed mechanical properties for the silicones filled with these mixed oxides. It emerged, however, that they are substantially poorer than the mechanical properties of the systems filled with fumed silica.

EP 2336230 A1 describes the use of cristobalite with refractive index n=1.53 as a thermal conductivity-improving filler in silicone compositions having a refractive index of, e.g., n=1.51. The filler differs in refractive index by not more than +/−0.03 from the refractive index of the vulcanizate of the polymer composition. As a result of the similarity in refractive index, it ought to be possible to produce transparent vulcanizates. Cristobalite, however, does not improve the mechanical properties.

There is therefore a need for silicone compositions having a refractive index higher than that of standard addition-crosslinking polymethylsiloxane systems (which have a refractive index of $n_D^{25}=1.41$) which at the same time exhibit improved mechanical properties as compared with existing systems. The requirement is for greater hardnesses in conjunction with improved elongation at break and consistently high transparency.

SUMMARY OF THE INVENTION

It was an object of the present invention, therefore, to provide silicone compositions featuring high refractive index, improved mechanical properties such as higher hardness in conjunction with better elongation at break, which at the same time, moreover, have a high transparency, in order to make it possible to meet more effectively all of the requirements of casting compounds or for components in optical systems.

These and other objects are surprisingly achieved by the addition-crosslinking silicone composition (X) of the invention, wherein the unsaturated organopolysiloxanes component has a refractive index 1.42, and a silica resin forcing filler is modified to have a refractive index within ±0.03 of the unsaturated organopolysiloxane.

DETAILED DESCRIPTION OF THE PREFERRED EMBODIMENTS

The addition-crosslinking silicone compositions (X) of the invention thus comprise
(A) at least one linear compound comprising radicals having aliphatic carbon-carbon multiple bonds,
(B) at least one linear organopolysiloxane having Si-bonded hydrogen atoms,
or, instead of (A) and (B),
(C) at least one linear organopolysiloxane comprising SiC-bonded radicals having aliphatic carbon-carbon multiple bonds, and Si-bonded hydrogen atoms,
(D) at least one hydrosilylation catalyst,
(E) at least one reinforcing filler comprising fumed or precipitated silicas having a BET surface area of at least 50 m²/g, characterized in that
 the refractive index $n_D^{25}$ of (A) and (C) is at least 1.42,
 the silica (E) through surface modification has a refractive index $n_D^{25}$ differing by at most 0.03 from (A) or/and (C), and
 the surface modification of (E) takes place either before compounding or in situ during compounding of the addition-crosslinking silicone composition (X).

The refractive index $n_D^{25}$ of (A) and (C) is determined as described later and is at least 1.42, preferably at least 1.46, and more preferably at least 1.48.

The addition-crosslinking silicone compositions (X) may be either one-component silicone compositions or two-component silicone compositions.

In the case of two-component silicone compositions, the two components of the addition-crosslinking silicone compositions (X) of the invention may comprise all constituents in any desired combination, generally with the proviso that one component does not simultaneously comprise siloxanes with aliphatic multiple bond, siloxanes with Si-bonded hydrogen, and catalyst, in other words essentially does not simultaneously comprise constituents (A), (B), and (D), or (C) and (D).

The compounds (A) and (B) and, respectively, (C) that are used in the addition-crosslinking silicone compositions (X) of the invention are selected, as is known, such that crosslinking is possible. Thus, for example, compound (A) has at least two aliphatically unsaturated radicals, and (B) has at least three Si-bonded hydrogen atoms, or compound (A) has at least three aliphatically unsaturated radicals and siloxane (B) has at least two Si-bonded hydrogen atoms, or else siloxane (C) is used instead of compound (A) and (B), this siloxane (C) having aliphatically unsaturated radicals and Si-bonded hydrogen atoms in the proportions stated above. Also possible are mixtures of (A) and (B) and (C) having the above-stated proportions of aliphatically unsaturated radicals and Si-bonded hydrogen atoms.

The addition-crosslinking silicone composition (X) of the invention customarily contains 30-95 wt %, preferably 50-90 wt %, and more preferably 60-90 wt % of (A). The addition-crosslinking silicone composition (X) of the invention customarily contains 0.1-60 wt %, preferably 0.5-50 wt %, and more preferably 1-30 wt % of (B). If the addition-crosslinking silicone composition (X) of the invention comprises component (C), there is customarily 30-95 wt %, preferably 50-90 wt %, more preferably 60-90 wt % of (C) present in the formulation.

The compound (A) used in accordance with the invention may comprise silicon-free organic compounds having preferably at least two aliphatically unsaturated groups, and also organosilicon compounds having preferably at least two aliphatically unsaturated groups, or mixtures thereof.

Examples of silicon-free organic compounds (A) are 1,3,5-trivinylcyclohexane, 2,3-dimethyl-1,3-butadiene, 7-methyl-3-methylene-1,6-octadiene, 2-methyl-1,3-butadiene, 1,5-hexadiene, 1,7-octadiene, 4,7-methylene-4,7,8,9-tetrahydroindene, methylcyclopentadiene, 5-vinyl-2-norbornene, bicyclo[2.2.1]hepta-2,5-diene, 1,3-diisopropenylbenzene, polybutadiene containing vinyl groups, 1,4-divinylcyclohexane, 1,3,5-triallylbenzene, 1,3,5-trivinylbenzene, 1,2,4-trivinylcyclohexane, 1,3,5-triisopropenylbenzene, 1,4-divinylbenzene, 3-methylhepta-1,5-diene, 3-phenylhexa-1,5-diene, 3-vinylhexa-1,5-diene, and 4,5-dimethyl-4,5-diethylocta-1,7-diene, N,N'-methylenebisacrylamide, 1,1,1-tris-(hydroxymethyl)propane triacrylate, 1,1,1-tris(hydroxy-methyl)propane trimethacrylate, tripropylene glycol diacrylate, diallyl ether, diallylamine, diallyl carbonate, N,N'-diallylurea, triallylamine, tris(2-methylallyl)amine, 2,4,6-triallyloxy-1,3,5-triazine, triallyl-s-triazine-2,4,6(1H,3H,5H)-trione, diallyl malonate, polyethylene glycol diacrylate, polyethylene glycol dimethacrylate, poly (propylene glycol) methacrylate.

As constituent (A), the addition-crosslinking silicone compositions (X) of the invention preferably comprise at least one aliphatically unsaturated organosilicon compound, in which case all aliphatically unsaturated organosilicon compounds useful in addition-crosslinking compositions may be employed, such as, for example, linear or branched organopolysiloxanes, silicone block copolymers having urea segments, silicone block copolymers having amide segments and/or imide segments and/or ester-amide segments and/or polystyrene segments and/or silarylene segments and/or carborane segments, and silicone graft copolymers having ether groups.

Organosilicon compounds (A) that have SiC-bonded radicals with aliphatic carbon-carbon multiple bonds are preferably linear or branched organopolysiloxanes comprising units of the general formula (I)

$$R^4_a R^5_b SiO_{(4-a-b)/2} \quad (I)$$

where
R$^4$ independently at each occurrence, is an organic or inorganic radical free from aliphatic carbon-carbon multiple bonds,
R$^5$ independently at each occurrence, is a monovalent, substituted or unsubstituted, SiC-bonded hydrocarbon radical having at least one aliphatic carbon-carbon multiple bond,
a is 0, 1, 2, or 3, and
b is 0, 1, or 2,
with the proviso that the sum a+b is less than or equal to 3 and there are at least 2 radicals R$^5$ per molecule.

Radical R$^4$ may comprise monovalent or polyvalent radicals, in which case the polyvalent radicals, such as divalent, trivalent, and tetravalent radicals, for example, join two or more, such as two, three, or four, for instance, siloxy units of the formula (I) to one another.

Further examples of R$^4$ are the monovalent radicals —F, —Cl, —Br, OR$^6$, —CN, —SCN, —NCO, and SiC-bonded, substituted or unsubstituted hydrocarbon radicals which may be interrupted by oxygen atoms or by the group —C(O)—, and also divalent radicals Si-bonded on both sides in accordance with formula (I). If radical R$^4$ comprises SiC-bonded, substituted hydrocarbon radicals, preferred substituents are halogen atoms, phosphorus-containing radicals, cyano radicals, —OR$^6$, —NR$^6$—, —NR$^6_2$, —NR$^6$—C(O)—NR$^6_2$, —C(O)—NR$^6_2$, —C(O)R$^6$, —C(O)OR$^6$, —SO$_2$—Ph, and —C$_6$F$_5$. In that case R$^6$, independently at each occurrence, identically or differently, denotes a hydrogen atom or a monovalent hydrocarbon radical having 1 to 20 carbon atoms, and Ph is the phenyl radical.

Examples of radicals R$^4$ are alkyl radicals such as the methyl, ethyl, n-propyl, isopropyl, n-butyl, iso-butyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as cyclopentyl, cyclohexyl, cycloheptyl, and methylcyclohexyl radicals; aryl radicals such as the phenyl, naphthyl, anthryl, and phenanthryl radicals, the indenyl, benzophenyl, fluorenyl, xanthenyl, and anthronyl radicals, alkaryl radicals such as the o-, m-, and p-tolyl radicals, xylyl radicals, and ethylphenyl radicals; and aralkyl radicals such as the benzyl radical, the cumyl radical, and the α- and the β-phenylethyl radicals.

Examples of substituted radicals R$^4$ are haloalkyl radicals such as the 3,3,3-trifluoro-n-propyl radical, the 2,2,2,2',2',2'-hexafluoroisopropyl radical, the heptafluoroisopropyl radical, haloaryl radicals, the chloromethyl radical, such as the o-, m-, and p-chlorophenyl radical, the o-, m-, and p-chloromethyl-phenyl radical, —(CH$_2$)—N(R$^6$)C(O)NR$^6_2$, —(CH$_2$)$_o$—C(O)NR$^6_2$, —(CH$_2$)$_o$—C(O)R$^6$, —(CH$_2$)$_o$—C(O)OR$^6$, —(CH$_2$)O—C(O)NR$^6_2$, —(CH$_2$)—C(O)—(CH$_2$)$_p$C(O)CH$_3$, —(CH$_2$)—O—CO—R$^6$, —(CH$_2$)—NR$^6$—(CH$_2$)$_p$—NR$^6_2$, —(CH$_2$)$_o$—O—(CH$_2$)$_p$CH(OH)CH$_2$OH, —(CH$_2$)$_o$(OCH$_2$CH$_2$)$_p$OR$^6$, —(CH$_2$)$_o$—SO$_2$—Ph, and —(CH$_2$)$_o$—O—C$_6$F$_5$, where R$^6$ and Ph correspond to the definition indicated therefor above, and o and p are identical or different integers between 0 and 10.

Examples of R$^4$ as divalent radicals Si-bonded on both sides in accordance with formula (I) are radicals which derive from the monovalent examples stated above for radical R$^4$ by virtue of an additional bond taking place through substitution of a hydrogen atom; examples of such radicals are —(CH$_2$)—, —CH(CH$_3$)—, —C(CH$_3$)$_2$—, —CH(CH$_3$)—CH$_2$—, —C$_6$H$_4$—, —CH(Ph)—CH$_2$—, —C(CF$_3$)$_2$—, —(CH$_2$)$_o$—C$_6$H$_4$—(CH$_2$)$_o$—, —(CH$_2$)$_o$—C$_6$H$_4$—C$_6$H$_4$—(CH$_2$)$_o$—, —(CH$_2$O)$_p$, (CH$_2$CH$_2$O)$_o$, —(CH$_2$)$_o$—O$_x$—C$_6$H$_4$—SO$_2$—C$_6$H$_4$—O$_x$—(CH$_2$)$_o$—, where x is 0 or 1, and Ph, o, and p have the definition stated above.

Preferably radical R$^4$ comprises a monovalent, SiC-bonded, optionally substituted hydrocarbon radical which has 1 to 18 carbon atoms and is free from aliphatic carbon-carbon multiple bonds, more preferably a monovalent, SiC-bonded hydrocarbon radical which has 1 to 6 carbon atoms and is free from aliphatic carbon-carbon multiple bonds, and more preferably the methyl or phenyl radical or chloromethyl radical.

Radical R$^5$ may comprise any desired groups amenable to an addition reaction (hydrosilylation) with an SiH-functional compound.

If radical R$^5$ comprises SiC-bonded, substituted hydrocarbon radicals, preferred substituents are halogen atoms, cyano radicals, and —OR$^6$, where R$^6$ has the above-stated definition.

Preferably radical R$^5$ comprises alkenyl and alkynyl groups having 2 to 16 carbon atoms, such as vinyl, allyl, methallyl, 1-propenyl, 5-hexenyl, ethynyl, butadienyl, hexadienyl, cyclopentenyl, cyclopenta-dienyl, cyclohexenyl, vinylcyclohexylethyl, divinyl-cyclohexylethyl, norbornenyl, vinylphenyl, and styryl radicals, with vinyl, allyl, and hexenyl radicals being particularly preferred for use.

The molecular weight of the constituent (A) may vary within wide limits, as for instance between 10$^2$ and 10$^6$ g/mol. Hence, for example, constituent (A) may comprise a relatively low molecular mass, alkenyl-functional oligosiloxane, such as 1,2-divinyltetramethyl-disiloxane, but may also be a high-polymer polydimethylsiloxane, for example with a molecular weight of 10$^3$ g/mol (number average determined by means of NMR), that possesses in-chain or terminal Si-bonded vinyl groups. The structure of the molecules forming the constituent (A) is also not fixed; in particular, the structure of a siloxane of relatively high molecular mass, in other words an oligomeric or polymeric siloxane, may be linear, cyclic, branched, or else resinous, network-like. Linear and cyclic polysiloxanes are preferably composed of units of the formula R$^4_3$SiO$_{1/2}$, R$^5$R$^4_2$SiO$_{1/2}$, R$^5$R$^4$SiO$_{2/2}$, and R$^4_2$SiO$_{2/2}$, where R$^4$ and R$^5$ have the definition indicated above. Branched and network-like polysiloxanes additionally include trifunctional and/or tetrafunctional units, with preference being given to those of the formulae R$^4$SiO$_{3/2}$, R$^5$SiO$_{3/2}$, and SiO$_{4/2}$. It will be appreciated that mixtures of different siloxanes satisfying the criteria of constituent (A) may also be used.

Particularly preferred as component (A) is the use of vinyl-functional, substantially linear polydiorgano-siloxanes having a viscosity of 0.01 to 500,000 Pa·s, more preferably of 0.1 to 100,000 Pa·s, in each case at 25° C.

As organosilicon compound (B) it is possible to use all hydrogen-functional organosilicon compounds which have are useful in addition-crosslinkable compositions.

Organopolysiloxanes (B) which have Si-bonded hydrogen atoms are preferably linear, cyclic, or branched organopolysiloxanes composed of units of the general formula (III)

$$R^4{}_c H_d SiO_{(4-c-d)/2} \quad (III)$$

where

R⁴ has the definition stated above, c is 0, 1, 2, or 3, and d is 0, 1, or 2, with the proviso that the sum of c+d is less than or equal to 3 and there are at least two Si-bonded hydrogen atoms per molecule.

The organopolysiloxane (B) used in accordance with the invention preferably contains Si-bonded hydrogen in the range from 0.04 to 1.7 percent by weight (wt %), based on the total weight of the organopolysiloxane (B).

The molecular weight of the constituent (B) may likewise vary within wide limits, as for instance between $10^2$ and $10^6$ g/mol. Thus constituent (B) may comprise, for example, an SiH-functional oligosiloxane of relatively low molecular mass, such as tetramethyldisiloxane, or alternatively may comprise a silicone resin having SiH groups or a high-polymeric polydimethylsiloxane that possesses SiH groups within the chain or terminally.

The structure of the molecules that form the constituent (B) is also not fixed; in particular, the structure of an SiH-containing siloxane of relatively high molecular mass, in other words oligomeric or polymeric, may be linear, cyclic, branched, or else resinous, network-like. Linear and cyclic polysiloxanes (B) are composed preferably of units of the formula $R^4{}_3SiO_{1/2}$, $HR^4{}_2SiO_{1/2}$, $HR^4SiO_{2/2}$, and $R^4{}_2SiO_{2/2}$, with $R^4$ having the definition indicated above. Branched and network-like polysiloxanes additionally include trifunctional and/or tetrafunctional units, with preference being given to those of the formulae $R^4SiO_{3/2}$, $HSiO_{3/2}$, and $SiO_{4/2}$, where $R^4$ has the definition indicated above.

It will be appreciated that mixtures of different siloxanes satisfying the criteria of constituent (B) may also be used. Particularly preferred is the use of low molecular mass, SiH-functional compounds such as tetrakis(dimethylsiloxy) silane and tetramethylcyclo-tetrasiloxane, and also of SiH-containing siloxanes of higher molecular mass, such as poly(hydrogen-methyl) siloxane and poly(dimethylhydrogenmethyl)-siloxane with a viscosity at 25° C. of 10 to 20,000 mPa·s, or similar SiH-containing compounds in which some of the methyl groups have been replaced by 3,3,3-trifluoropropyl or phenyl groups.

In one preferred embodiment the refractive index $n_D{}^{25}$ of (B) also differs by at most 0.03 from (A) or/and (C). More particularly by at most 0.02.

The amount of constituent (B) in the crosslinkable silicone compositions (X) of the invention is preferably such that the molar ratio of SiH groups to aliphatically unsaturated groups from (A) is 0.1 to 20, more preferably between 0.3 and 2.0.

The components (A) and (B) used in accordance with the invention are commercial products and/or may be prepared by methods that are common within chemistry.

Instead of component (A) and (B), the silicone compositions of the invention may comprise organopolysiloxanes (C), simultaneously having aliphatic carbon-carbon multiple bonds and Si-bonded hydrogen atoms. The silicone compositions of the invention may also comprise all three components (A), (B), and (C).

If siloxanes (C) are used, these are preferably composed of units of the general formulae (IV), (V), and (VI)

$$R^4{}_f SiO_{3/2} \quad (IV)$$

$$R^4{}_g R^5 SiO_{2-g/2} \quad (V)$$

$$R^4{}_h HSiO_{2-h/2} \quad (VI)$$

where $R^4$ and $R^5$ have the definition indicated for them above, f is 0, 1, 2, or 3, g is 0, 1, or 2, and h is 0, 1, or 2, with the proviso that per molecule there are at least 2 radicals $R^5$ and at least 2 Si-bonded hydrogen atoms.

Examples of organopolysiloxane (C) are those comprising $SiO_{4/2}$, $R^4SiO_{3/2}$, $R^4{}_2SiO_{2/2}$, $R^4R^5SiO_{2/2}$, $R^4HSiO_{2/2}$, $R^4{}_3SiO_{1/2}$, $R^4{}_2R^5SiO_{1/2}$, and $R^4{}_2HSiO_{1/2}$ units, in other words, for example, what are called MQ, MDQ, MDT, and MT resins, and also linear organopolysiloxanes substantially consisting of $R^4{}_2R^5SiO_{1/2}$, $R^4{}_2SiO_{2/2}$, and $R^4HSiO_{2/2}$ units and also optionally with $R^4{}_2HSiO_{1/2}$ and $R^4R^5SiO_{2/2}$ units, with $R^4$ and $R^5$ meeting the aforementioned definition.

The organopolysiloxanes (C) preferably possess an average viscosity of 0.01 to 500,000 Pa·s, more preferably 0.1 to 100,000 Pa·s, in each case at 25° C. Organopolysiloxanes (C) are preparable by techniques that are common within chemistry.

As hydrosilylation catalyst (D) it is possible to use all of the catalysts known to the prior art. Component (D) may be a platinum group metal, as for example platinum, rhodium, ruthenium, palladium, osmium, or iridium, or an organometallic compound, or a combination thereof. Examples of component (D) are compounds such as hexachloroplatinic (IV) acid, platinum dichloride, platinum acetylacetonate, and complexes of said compounds encapsulated in a matrix or in a core/shell-like structure. The platinum complexes with low molecular weight of the organopolysiloxanes include 1,3-diethenyl-1,1,3,3-tetramethyldisiloxane complexes with platinum. Other examples are platinum-phosphite complexes or platinum-phosphine complexes. For photocuring or UV-curing compositions, for example, alkylplatinum complexes such as derivatives of cyclopentadienyltrimethylplatinum(IV), cyclooctadienyl-dimethylplatinum(II), or diketonato complexes, such as bisacetylacetonatoplatinum(II), for example, may be used in order to start the addition reaction by means of light. These compounds may be encapsulated within a resin matrix.

The concentration of component (D) is to be sufficient for catalyzing the hydrosilylation reaction of components (A) and (B) and (C). The amount of component (D) may be between 0.1 and 1000 parts per million (ppm), 0.5 and 100 ppm, or 1 and 25 ppm of the platinum group metal, based on the total weight of the components. The curing rate may be low if the constituent of the platinum group metal is below 1 ppm. The use of more than 100 ppm of the platinum group metal is uneconomical or lowers the storage stability of the silicone composition (X).

The addition-crosslinking silicone compositions (X) comprise as a further additive at least one reinforcing filler (E) from the group of the fumed or precipitated silicas having a BET surface area of at least 50 m²/g, and having been surface-modified, so that their refractive index $n_D{}^{25}$ differs from (A) or/and (C) by at most 0.03, preferably by at most 0.015.

The amount of actively reinforcing filler (E) in the crosslinkable silicone compositions (X) of the invention is in the range from 1 to 50 wt %, preferably 5 to 40 wt %, more preferably 10 to 35 wt %.

Preferred as (E) are precipitated or fumed silicas, more particularly fumed silica. Particularly preferred is a silica having a specific BET surface area of 80-400 m$^2$/g, more preferably 100-400 m$^2$/g.

The surface modification of (E) is known to the skilled person.

The surface modification of the silica (E) may take place either before production (i.e., compounding) of addition-crosslinking silicone compositions (X) or during compounding in the presence of an agent by the in situ method. Both methods may be carried out either as a batch operation or continuously. Agents used may be any surface-modifying agents known to one skilled in the art, such as hydrophobizing agents or silylating agents, for example.

These are preferably organometallic compounds or semimetal compounds, such as silicon compounds, titanium compounds, zirconium compounds, aluminum compounds, or the oxides, nitrides, or carbides of the metal compounds or semimetal compounds, and precursors of these oxides or salts of the oxygen acids of the metals, such as barium titanate or strontium titanate.

Among the silicon compounds, silazanes and/or polysilazanes may be used, and water as well may additionally be employed. Also possible is the use of silylating agents having hydrolysable or reactive groups, known as hydrophobizing agents. Reactive groups which can be used are, for example, the SiOH, SiCl and/or SiOR groups in corresponding functional silanes or siloxanes. Also possible is the use of cyclic, linear, or branched nonfunctional organosiloxanes, such as octaorganocyclotetrasiloxane or polydiorgano-siloxane, for example.

The agents for the surface treatment may be used alone or as a mixture or in succession as silylating agents.

The functional silanes or the linear or branched organosiloxanes preferably comprise organic radicals R$^4$ which produce an increase in the refractive index, R$^4$ having the above definition.

In order to accelerate the surface modification, the addition of catalytically active additives, such as hydroxides, for example, is also possible. The surface modification may take place in one step, using one or more agents, or else using one or more agents in two or more steps.

Examples of organofunctional silanes are silazanes such as hexamethyldisilazane, 1,3-divinyl-1,1,3,3-tetramethyldisilazane, alkoxysilanes such as trimethoxymethylsilanes, dimethoxydimethylsilane, trimethoxyphenylsilane, dimethoxydiphenylsilane, trimethoxynaphthylsilane, chlorosilanes such as trimethylchlorosilane, dimethyldichlorosilane, triphenylchlorosilane, diphenyldichlorosilane, and naphthyltrichlorosilane.

Examples of siloxanes are OH- or chlorine- or alkoxy-terminated polydimethylsiloxanes, polydimethylmethylphenylsiloxanes, polymethylphenylsiloxanes, poly-dimethyldiphenylsiloxanes, and polydiphenylsiloxanes.

In the case of one method, which directly follows the preparation of the hydrophilic silica, the silica is atomized under a nitrogen atmosphere and admixed with DI water. Thereafter an organofunctional silane or siloxane is added by atomization under a nitrogen atmosphere, and the reaction mixture is homogenized with stirring at room temperature (25° C.) and subsequently heated at not less than 200° C., preferably not less than 300° C., for 0.5 to 10 hours.

In the case of another method, in a kneading apparatus or dissolver, component (A) and/or (C) is introduced together with the organofunctional silane or siloxane, and a hydrophilic silica is incorporated with kneading. Thereafter the mixture is heated at not less than 150° C. for 0.5 to 10 hours with kneading, preferably under a nitrogen atmosphere.

According to the method described above, at least 20%, preferably at least 50%, of the originally free OH groups of the silica (X) must have been occupied in order to bring about the desired higher refractive index $n_D^{25}$.

Preference is given to using fumed silicas (E) with surface modification by arylsilane or arylsiloxane.

In the silicone compositions (X) there may be further, optional constituents (F) present, at a fraction of up to 70 wt %, such as, for example, inhibitors, other silicone resins, different from (A), (B), and (C), adhesion promoters, and further additives for adapting the thermal conductivity, improving the temperature stability, light scattering, light conversion (also known to the skilled person as phosphors), nonreinforcing fillers, fungicides, fragrances, rheological additives, corrosion inhibitors, oxidation inhibitors, light stabilizers, flame retardants, and agents for influencing the electrical and thermal properties, dispersing assistants, solvents, adhesion promoters, pigments, dyes, plasticizers, organic polymers, heat stabilizers, and so on.

The silicone compositions (X) of the invention are produced by the mixing of components (A), (B) and/or (C) with (D) and (E) and, as and when required, with additional constituents (F).

The silicone compositions (X) of the invention may be used as casting compounds for, for example, LEDs and also for the production of optical components such as, for example, lenses, primary or secondary optical systems. Components produced from the silicone compositions (X) of the invention may be employed, for example, in applications of lighting, vehicle lighting, optical systems or Fresnel optical systems.

Depending on properties such as viscosity, the silicone compositions (X) of the invention may be processed by any of the processing techniques known to the skilled person, such as, for example, casting, dispensing, coating, knife-coating, screen printing, injection molding, transfer molding, and so they cure to form moldings or coatings, for example, during processing or subsequently.

Methods of Measurement and Analysis:
Determination of Carbon Content (% C)

Elemental analysis for carbon took place according to DIN ISO 10694 using a CS-530 elementary analyzer from Eltra GmbH (D-41469 Neuss).

Determining the Residual Amount of Unmodified Silica Silanol Groups (% SiOH)

The residual silanol content was determined in analogy to G. W. Sears et al. Analytical Chemistry 1956, 28, 1981ff by means of acid-base titration of the silica in suspension in a 1:1 mixture of water and methanol. The titration took place in the region above the isoelectric point and below the pH range of dissolution of the silica.

The residual silanol content in % (% SiOH) can be computed accordingly by the following formula:

% SiOH=SiOH(silyl)/SiOH(phil)*100 where
SiOH(phil): titration volume from the titration of the untreated silica
SiOH(silyl): titration volume from the titration of the silylated silica Viscosity:

Viscosities are determined in analogy to DIN EN ISO 3219 by rotational-viscosimetric measurements in a plate/cone method at 25° C. under atmospheric pressure of 1013 mbar on a rheological instrument from Anton Paar, Ostfildern, Germany. In the case of non newtonian systems, the shear rate is reported in each case.

Refractive Index:

The refractive indices are determined using a refractometer from A. Krüss Optronics, Hamburg, Germany in the wavelength range of visible light. Unless otherwise indicated, the refractive index in question is $n_D^{25}$, determined accordingly at 589 nm and 25° C. under atmospheric pressure of 1013 mbar in accordance with the standard DIN 51423.

The refractive index of (E) is determined indirectly. 5 wt % of the silica (E) are incorporated homogeneously in a diorganopolysiloxane of defined refractive index which is liquid at room temperature of 25° C. under atmospheric pressure of 1013 mbar (="filled sample"). Liquid diorganopolysiloxanes with different refractive indices are used. If the refractive index of the silica differs from the refractive index of the diorgano-polysiloxane, the light is refracted at the interface between silica and polymer, and the mixture appears hazy. If, on the other hand, the refractive index of the silica (E) coincides with the refractive index of the diorganopolysiloxane, within a tolerance of +/−0.03, the mixture appears transparent. In that case, the value for the refractive index of the diorganopolysiloxane is also assumed for the silica (E).

The refractive index of the diorganopolysiloxane can be adjusted via the selection (e.g., phenyl groups) and the fraction in mol % of the organic groups in the diorganopolysiloxane. A higher fraction of phenyl groups, for example, produces a higher refractive index. For indirect determination of the refractive index of the silicas (E), series of diorganopolysiloxanes with increasing refractive index were used (e.g., $n_D^{25}$=1.460, 1.470 . . . ). For precision determination of the refractive index of the silicas (E), diorganopolysiloxanes with a smaller difference in refractive index were used (e.g., $n_D^{25}$=1.4950, 1.500, . . . ).

The transparency is determined via measurement of the transmission fraction of incident light in percent at wavelengths between 400 and 800 nm, using an Analytik Jena Specord 200 UV-Vis spectrometer.

The transmission of the filled samples is measured in quartz cells having a path length of 10 mm at 25° C. under atmospheric pressure of 1013 mbar.

Filled samples are deemed transparent if the measurement produces a transmission of at least 70%, preferably at least 80%.

For filled samples measured as being transparent, the value of the refractive index of the silica (E) corresponds to the value of the diorganopolysiloxane used.

The transmission of vulcanized samples is measured on sample plates having a layer thickness of 2 mm at 25° C. under atmospheric pressure of 1013 mbar.

Vulcanized samples are deemed transparent if the measurement produces a transmission of at least 80%, preferably at least 85%.

Mechanical Properties:

The Shore A hardness is determined according to DIN (Deutsche Industrie Norm) 53505 (August 2000 edition).

Tensile strength and elongation at break are determined according to ISO 37 on specimens of form S3a.

EXAMPLES

The examples which follow serve to elucidate the invention without restricting it. Unless otherwise indicated, work took place at room temperature (25° C.) and atmospheric pressure (1013 mbar).

Silica 1:

Added to 120 g of a hydrophilic silica having a specific surface area of 300 m²/g, determined by the BET method in accordance with DIN 66131 and 66132 (available under the name HDK® T30 from Wacker Chemie AG, Munich, Germany) under a nitrogen atmosphere, by jetting through a two-fluid nozzle (hollow cone nozzle, model 121, from Düsen-Schlick GmbH, D-96253 Untersiemau/Coburg, 30° spray angle, 0.1 mm bore, operated with 5 bar nitrogen) were 6.6 g of DI water. Added subsequently in a similar way were 30.0 g of diphenyldimethoxysilane (acquired from Sigma-Aldrich Chemie GmbH, D-89555 Steinheim) (hollow cone nozzle, model 121, from Düsen-Schlick GmbH, D-96253 Untersiemau/Coburg, 30° spray angle, 0.2 mm bore, operated with 5 bar nitrogen). The reaction mixture was homogenized by stirring at room temperature for 30 minutes and then heated at 300° C. for two hours.

The carbon content of the product was found to be 9.6%. The residual silanol content of the material was 22%. The refractive index, determined indirectly, is 1.495+/−0.01.

Silica 2:

Added to 120 g of a hydrophilic silica having a specific surface area of 300 m²/g, determined by the BET method in accordance with DIN 66131 and 66132 (available under the name HDK® T30 from Wacker Chemie AG, Munich, Germany) under a nitrogen atmosphere, by jetting through a two-fluid nozzle (hollow cone nozzle, model 121, from Düsen-Schlick GmbH, D-96253 Untersiemau/Coburg, 30° spray angle, 0.1 mm bore, operated with 5 bar nitrogen) were 10.0 g of DI water. Added subsequently in a similar way were 24.4 g of phenyltrimethoxysilane (acquired from Sigma-Aldrich Chemie GmbH, D-89555 Steinheim) (hollow cone nozzle, model 121, from Düsen-Schlick GmbH, D-96253 Untersiemau/Coburg, 30° spray angle, 0.2 mm bore, operated with 5 bar nitrogen). The reaction mixture was homogenized by stirring at room temperature for 30 minutes and then heated at 300° C. for two hours.

The carbon content of the product was found to be 6.6%. The residual silanol content of the material was 42%. The refractive index, determined indirectly, is 1.495+/−0.01.

Silica 3:

Added to 120 g of a hydrophilic silica having a specific surface area of 300 m²/g, determined by the BET method in accordance with DIN 66131 and 66132 (available under the name HDK® T30 from Wacker Chemie AG, Munich, Germany) under a nitrogen atmosphere, by jetting through a two-fluid nozzle (hollow cone nozzle, model 121, from Düsen-Schlick GmbH, D-96253 Untersiemau/Coburg, 30° spray angle, 0.2 mm bore, operated with 5 bar nitrogen) were 30.0 g of a hydroxyl-terminated oligo-phenyl-methyl siloxane having an average chain length, determined via $^{29}$Si NMR spectroscopy, of seven siloxy units and a silanol content of 4 wt %. The reaction mixture was homogenized by stirring at room temperature for 30 minutes and then heated at 300° C. for two hours.

The carbon content of the product was found to be 10.4%. The residual silanol content of the material was 16%. The refractive index, determined indirectly, is 1.500+/−0.01.

Silica 4:

Added to 120 g of a hydrophilic silica having a specific surface area of 300 m²/g, determined by the BET method in accordance with DIN 66131 and 66132 (available under the name HDK® T30 from Wacker Chemie AG, Munich, Germany) under a nitrogen atmosphere, by jetting through a two-fluid nozzle (hollow cone nozzle, model 121, from Düsen-Schlick GmbH, D-96253 Untersiemau/Coburg, 30° spray angle, 0.1 mm bore, operated with 5 bar nitrogen) were 10.0 g of DI water. Added subsequently in a similar way were 30.6 g of naphthyltrimethoxysilane (acquired from ABCR GmbH, D-76187 Karlsruhe) (hollow cone nozzle, model 121, from Düsen-Schlick GmbH, D-96253 Untersiemau/Coburg, 30° spray angle, 0.2 mm bore, operated with 5 bar nitrogen). The reaction mixture was homogenized by stirring at room temperature for 30 minutes and then heated at 250° C. for two hours.

The carbon content of the product was found to be 8.9%. The residual silanol content of the material was 46%. The refractive index, determined indirectly, is 1.53+/−0.02.

Example 1

In a kneading apparatus, 70 parts of a vinyl-terminated polydimethylphenylmethylsiloxane copolymer with the composition $(Me_2ViSiO_{1/2})_2(MePhSiO_{2/2})_{49}(Me_2SiO_{2/2})_{124}$ (refractive index $n_D^{25}$=1.46, viscosity η=2500 mPas) are mixed with 30 parts of a hydrophobic fumed silica occupied with trimethylsiloxy groups (BET surface area 200 m$^2$/g, carbon content 3%, residual silanol content 25%, indirectly determined refractive index $n_D^{25}$=1.46+/−0.01). 100 parts of this mixture are mixed with 1.6 parts of an SiH-containing polydimethylphenylmethylsiloxane copolymer (refractive index $n_D^{25}$=1.45, SiH content 8 mmol/g, viscosity η=40 mPas) and 0.0005 part (based on platinum) of a platinum-1,3-divinyl-1,1,3,3-tetramethyldisiloxane complex. The mixture is vulcanized under pressure at 165° C. for 15 minutes. The vulcanizate has a Shore A hardness of 55, a tensile strength of 4 N/mm$^2$, and an elongation at break of 300%. The sample exhibits transmission of >85% at wavelengths λ between 400 and 800 nm in a layer thickness of 2 mm.

Example 2 (Not Inventive)

In a kneading apparatus, 70 parts of a vinyl-terminated polydimethylsiloxane with the composition $(Me_2ViSiO_{1/2})_2(Me_2SiO_{2/2})_{180}$(refractive index $n_D^{25}$=1.41, viscosity η=500 mPas) are mixed with 30 parts of a hydrophobic fumed silica treated with trimethylsiloxy groups (BET surface area 200 m$^2$/g, carbon content 3%, residual silanol content 25%, indirectly determined refractive index $n_D^{25}$=1.46). 100 parts of this mixture are mixed with 1.6 parts of an SiH-containing polydimethylsiloxane (SiH content 5 mmol/g, viscosity η=80 mPas) and 0.001 part (based on platinum) of a platinum-1,3-divinyl-1,1,3,3-tetramethyldisiloxane complex. The mixture is vulcanized under pressure at 165° C. for 15 minutes. The vulcanizate is translucent and has a Shore A hardness of 52, a tensile strength of 3 N/mm$^2$, and an elongation at break of 190%. The sample exhibits transmission of less than 80% at wavelengths λ between 500 and 800 nm in a layer thickness of 2 mm, and transmission of less than 70% at wavelengths λ between 400 and 500 nm.

Example 3 (Not Inventive)

100 parts of a vinyl-terminated polydimethylphenylmethylsiloxane copolymer having the composition $(Me_2ViSiO_{1/2})_2(Me_2PhSiO_{2/2})_{72}(Me_2SiO_{2/2})_{14}$ (refractive index $n_D^{25}$=1.53, viscosity η=10,000 mPas) are mixed with 8 parts of an SiH-containing polydimethylphenylmethylsiloxane copolymer (refractive index $n_D^{25}$=1.49, SiH content 5 mmol/g, viscosity η=70 mPas) and 0.0001 part (based on platinum) of a platinum-1,3-divinyl-1,1,3,3-tetramethyldisiloxane complex. The mixture is vulcanized under pressure at 165° C. for 15 minutes. The vulcanizate is transparent and has a Shore A hardness of 25. The sample is brittle and fragments when specimens are punched out. Tensile strength and elongation at break cannot be measured.

Example 4 (Not Inventive)

100 parts of a vinyl-terminated polydimethylsiloxane having the composition $(Me_2ViSiO_{1/2})_2(Me_2SiO_{2/2})_{180}$ (refractive index $n_D^{25}$=1.41, viscosity η=500 mPas) are mixed in a dissolver with 5 parts of a hydrophobic fumed silica treated with trimethylsiloxy groups (BET surface area 200 m$^2$/g, carbon content 3%, residual silanol content 25%, indirectly determined refractive index $n_D^{25}$=1.46+/−0.01). The sample is devolatilized in a desiccator using a vacuum pump. The mixture is hazy and exhibits transmission of <80% at wavelengths λ between 500 and 800 nm in a layer thickness of 10 mm, and transmission of <60% at wavelengths <500 nm.

Example 5 (Not Inventive)

100 parts of a vinyl-terminated polydimethylsiloxane having the composition $(Me_2ViSiO_{1/2})_2(Me_2SiO_{2/2})_{180}$ (refractive index $n_D^{25}$=1.41, viscosity η=500 mPas) are mixed in a dissolver with 5 parts of silica 3. The sample is devolatilized in a desiccator using a vacuum pump. The mixture is hazy and exhibits transmission of <70% at wavelengths λ between 500 and 800 nm in a layer thickness of 10 mm, and transmission of <50% at wavelengths <500 nm.

Example 6 (Not Inventive)

100 parts of a vinyl-terminated polydimethylphenylmethylsiloxane copolymer having the composition $(Me_2ViSiO_{1/2})_2(MePhSiO_{2/2})_{49}(Me_2SiO_{2/2})_{124}$ (refractive index $n_D^{25}$=1.46, viscosity η=2500 mPas) are mixed in a dissolver with 5 parts of silica 2. The sample is devolatilized in a desiccator using a vacuum pump. The mixture is hazy and exhibits transmission of <80% at wavelengths λ between 500 and 800 nm in a layer thickness of 10 mm, and transmission of <50% at wavelengths <500 nm.

Example 7

100 parts of a vinyl-terminated polydimethylphenylmethylsiloxane copolymer having the composition $(Me_2ViSiO_{1/2})_2(MePhSiO_{2/2})_{25}(Me_2SiO_{2/2})_{21}$ (refractive index $n_D^{25}$=1.50, viscosity η=600 mPas) are mixed in a dissolver with 5 parts of silica 1. The sample is devolatilized in a desiccator using a vacuum pump. The mixture is transparent and colorless. The sample exhibits transmission of >80% at wavelengths λ between 400 and 800 nm in a layer thickness of 10 mm.

Example 8

In a kneading apparatus, 80 parts of a vinyl-terminated polydimethylphenylmethylsiloxane copolymer having the composition $(Me_2ViSiO_{1/2})_2(MePhSiO_{2/2})_{55}(Me_2SiO_{2/2})_{53}$ (refractive index $n_D^{25}$=1.50, viscosity η=3300 mPas) are mixed with 20 parts of silica 1. The mixture is transparent. The refractive index of the mixture determined is $n_D^{25}$=1.50. Respective viscosity η=300,000 mPas at D=25 s$^{-1}$ and η=550,000 mPas at D=10 s$^{-1}$. 100 parts of this mixture are mixed with 4 parts of an SiH-containing polydimethylphenylmethylsiloxane copolymer (refractive index $n_D^{25}$=1.49, SiH content 5 mmol/g, viscosity η=70 mPas) and 0.0005 part (based on platinum) of a platinum-1,3-divinyl-1,1,3,3-tetramethyldisiloxane complex. The mixture is vulcanized under pressure at 165° C. for 15 minutes. The vulcanizate has a Shore A hardness of 60, a tensile strength of 2.8 N/mm$^2$, and an elongation at break of 190%.

The sample exhibits transmission of >85% at wavelengths λ between 400 and 800 nm in a layer thickness of 2 mm.

Example 9

In a kneading apparatus, 80 parts of a vinyl-terminated polydimethylphenylmethylsiloxane copolymer with the composition $(Me_2ViSiO_{1/2})_2(MePhSiO_{2/2})_{72}(Me_2SiO_{2/2})_{14}$ (refractive index $n_D^{25}$=1.53, viscosity η=10,000 mPas) are mixed with 20 parts of silica 4. The mixture is transparent. 100 parts of this mixture are mixed with 5 parts of an SiH-containing polydimethylphenylmethylsiloxane copolymer (refractive index $n_D^{25}$=1.49, SiH content 5 mmol/g, viscosity η=70 mPas) and 0.0005 part (based on platinum) of a platinum-1,3-divinyl-1,1,3,3-tetramethyldisiloxane complex. The mixture is vulcanized under pressure at 165° C. for 15 minutes. The vulcanizate is transparent and has a Shore A hardness of 55, a tensile strength of 2.1 N/mm$^2$, and an elongation at break of 150%.

Example 10

In a kneading apparatus, 77 parts of a vinyl-terminated polydimethylphenylmethylsiloxane copolymer with the composition $(Me_2ViSiO_{1/2})_2(MePhSiO_{2/2})_{168}(Me_2SiO_{2/2})_{163}$ (refractive index $n_D^{25}$=1.50, viscosity η=52,000 mPas) are mixed with 23 parts of silica 3. The mixture is transparent. The refractive index of the mixture is $n_D^{25}$=1.50. 100 parts of this mixture are mixed with 1.45 parts of an SiH-containing polydimethylphenylmethylsiloxane copolymer (refractive index $n_D^{25}$=1.49, SiH content 5 mmol/g, viscosity η=70 mPas) and 0.0005 part (based on platinum) of a platinum-1,3-divinyl-1,1,3,3-tetramethyldisiloxane complex. The mixture is vulcanized under pressure at 165° C. for 15 minutes. The vulcanizate has a Shore A hardness of 55, a tensile strength of 3.7 N/mm$^2$, and an elongation at break of 310%. The sample exhibits a transmission of >85% at wavelengths λ between 400 and 800 nm in a layer thickness of 2 mm.

The invention claimed is:

1. In a process wherein a casting compound is used in the manufacture of an optical component, the improvement comprising casting, employing as a casting compound, an addition-crosslinking silicone composition comprising:
   (A) at least one linear compound comprising radicals having aliphatic carbon-carbon multiple bonds,
   (B) at least one linear organopolysiloxane having Si-bonded hydrogen atoms, or, instead of (A) and (B),
   (C) at least one linear organopolysiloxane comprising SiC-bonded radicals having aliphatic carbon-carbon multiple bonds, and Si-bonded hydrogen atoms,
   wherein the refractive index $n_D^{25}$ of (A) and (C) is at least 1.48,
   (D) at least one hydrosilylation catalyst,
   (E) at least one reinforcing filler comprising fumed silica having a BET surface area of 100-400 m$^2$/g, surface modified to have a refractive index $n_D^{25}$ differing by at most 0.03 from (A) and/or (C), by reacting with an aryl-silane prior to compounding with other ingredients of the addition-crosslinking silicone composition.

2. The process of claim 1, wherein the optical component is an optical component for a LED device.

3. The process of claim 1, wherein the optical component is an optical component of a non-vehicle lighting system, a vehicle lighting system, an optical system, or a Fresnel optical system.

4. The process of claim 1, wherein the refractive index $n_D^{25}$ of (A) and (C) is at least 1.50.

5. The process of claim 2, wherein the refractive index $n_D^{25}$ of (A) and (C) is at least 1.50.

6. The process of claim 1, wherein the refractive index $n_D^{25}$ of the surface-treated silica differs by not more than 0.015 from (A) and/or (C).

7. The process of claim 2, wherein the refractive index $n_D^{25}$ of the surface-treated silica differs by not more than 0.015 from (A) and/or (C).

8. The process of claim 1, wherein the refractive index $n_D^{25}$ of (B) differs by at most 0.03 from (A) and/or (C).

9. The process of claim 2, wherein the refractive index $n_D^{25}$ of (B) differs by at most 0.03 from (A) and/or (C).

10. The process of claim 1, wherein the addition-crosslinking silicone composition comprises at least one further constituent (F) selected from the group consisting of inhibitors, silicone resins different from (A), (B), and (C), adhesion promoters, additives for adapting the thermal conductivity, for improving the temperature stability, for improving light scattering or light conversion, nonreinforcing fillers, fungicides, fragrances, rheological additives, corrosion inhibitors, oxidation inhibitors, light stabilizers, flame retardants, agents for influencing the electrical and thermal properties, dispersing assistants, solvents, adhesion promoters, pigments, dyes, plasticizers, and organic polymers.

11. The process of claim 1, wherein the addition-crosslinking silicone compositions are produced by mixing components (A), (B) and/or (C) with (D) and (E).

12. The process of claim 10, wherein the addition-crosslinking silicone compositions are produced by mixing components (A), (B) and/or (C) with (D) and (E) and (F).

13. The process of claim 1, wherein the reinforcing filler (E) is present in an amount of from 5-40 wt. % relative to the total weight of all components.

14. The process of claim 1, wherein the reinforcing filler (E) is present in an amount of from 10-350 wt. % relative to the total weight of all components.

15. The process of claim 1, wherein the aryl silane is naphthyltrimethoxysilane.

* * * * *